United States Patent
Volk

[11] Patent Number: 5,824,987
[45] Date of Patent: Oct. 20, 1998

[54] WELDING STUD FEEDER

[75] Inventor: Josef Volk, Harthausen, Germany

[73] Assignee: HBS Bolzenschweiss-Systeme GmbH & Co. KG, Dachan, Germany

[21] Appl. No.: 700,063

[22] Filed: Aug. 19, 1996

[30] Foreign Application Priority Data

Aug. 17, 1995 [DE] Germany ............... 195 30 324.5

[51] Int. Cl.⁶ ............................................. B23K 9/20
[52] U.S. Cl. ............................................. 219/98
[58] Field of Search ................. 219/98, 99; 414/798.9

[56] References Cited

U.S. PATENT DOCUMENTS

| | | | |
|---|---|---|---|
| 3,303,318 | 2/1967 | Spisak | 219/98 |
| 3,321,607 | 5/1967 | Facone et al. | 219/98 |
| 3,371,184 | 2/1968 | Napoli | 219/98 |
| 3,546,420 | 12/1970 | Ettinger | 219/98 |
| 3,679,860 | 7/1972 | Spisak | 219/98 |
| 3,792,223 | 2/1974 | Spisak | 219/98 |
| 3,835,285 | 9/1974 | Hinden et al. | 219/98 |
| 4,438,314 | 3/1984 | Giannone | 219/98 |
| 4,469,928 | 9/1984 | Wilkinson et al. | 219/98 |
| 5,473,134 | 12/1995 | Susgin | 219/98 |

FOREIGN PATENT DOCUMENTS 0 639 424  2/1995  European Pat. Off. .

Primary Examiner—Clifford C. Shaw
Attorney, Agent, or Firm—Foley & Lardner

[57] ABSTRACT

An automatic welding stud feeder for a stud welding gun 10 comprises a magazine 40 provided at the upper side of the gun and a transfer lever 26 for transferring the respective foremost welding stud in the magazine 40, by pivotal movement through a substantially quarter-circular path, to an operating position in front of a welding electrode 14. The driving force for the transfer lever 26 is generated by springs 24 which are compressed when the welding electrode 14 with the stud 43 is pushed against the workpiece 50. In its rest position, the transfer lever 26 is locked by a catch 36. The catch 36 is actuated by a release lever 35 which is operated with the thumb of the same hand that holds the welding gun.

9 Claims, 3 Drawing Sheets

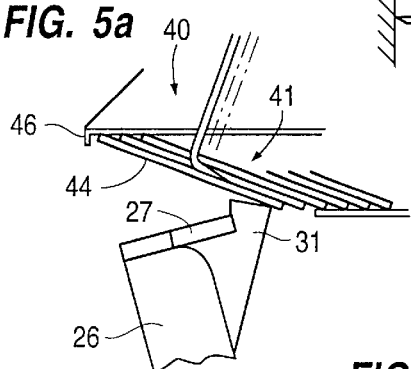
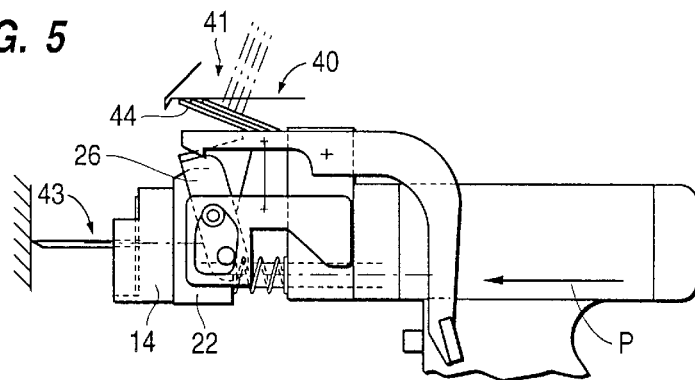
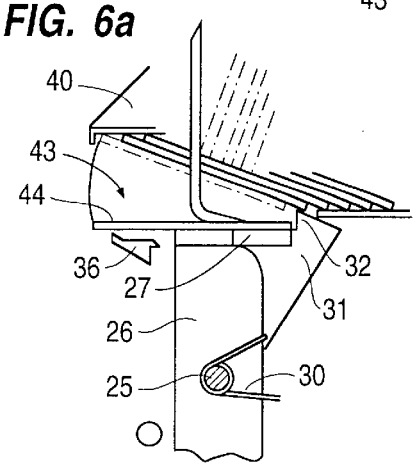
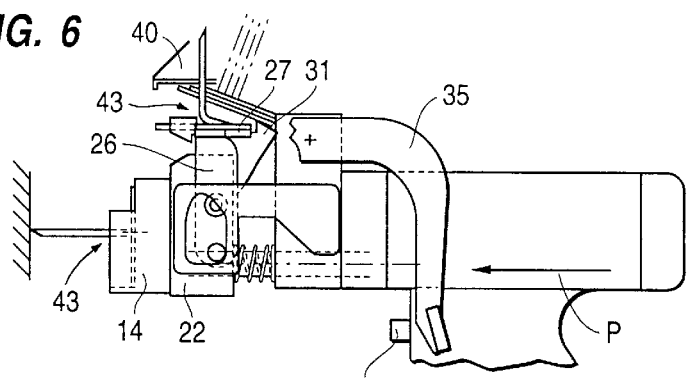

WELDING STUD FEEDER

BACKGROUND OF THE INVENTION

The present invention relates to a magazine-type welding stud feeder for a stud welding gun in which the studs are fed, one by one, to the welding gun automatically by the actuation of the gun.

The welding studs that may be used in connection with the feeder of the present invention are, specifically, studs with a large sheet-metal head portion as disclosed in European Patent Application 0,639,424. Welding studs of this type are suited, for instance, for fixing an insulating mat to a metal workpiece. In the document, the individual welding studs are described as being manually mounted on a stud holder of the welding gun, pressed with their tip through the insulating mat and then welded to the workpiece.

U.S. Pat. No. 3,835,285 describes an arrangement for feeding welding studs in a stud welding machine with a magazine which holds the welding studs in an orientation different from their operating position, and a mechanism for transferring the respective foremost welding stud in the magazine to the electrode of the stud welding machine.

In this known apparatus, the magazine extends vertically. The lowermost welding stud, when released, travels down a sloping surface, thereby turning into an orientation parallel to the operating position. Prior to the welding step, the stud is translated to its final operating position in which it is received by the welding electrode of the machine, pressed against the workpiece and welded thereto.

The known welding apparatus is designed as a stationary machine. The welding studs are moved by gravity to a lower dispensing end of the magazine, and the transfer from the magazine to the operating location is performed with the aid of a double-acting pneumatic cylinder. Due to the size, the vertical orientation of the magazine, and the energy required for feeding the individual studs, this type of welding stud feeder is unsuited for hand-held apparatus, such as stud welding guns commonly used at construction sites and elsewhere.

U.S. Pat. No. 3,371,184 discloses a welding gun with a welding stud magazine attached to a front part of the gun, wherein the energy for withdrawing the respective foremost stud from the magazine is generated by pressing the welding gun against the workpiece. In this known device, the magazine extends perpendicularly to the longitudinal axis of the gun, so that the studs can always be maintained in the orientation in which they are welded. The apparatus, however, is bulky and therefore limited in its use.

SUMMARY OF THE INVENTION

It is an object of the invention to provide a welding stud feeder which is compact and suited for use with hand-held welding apparatus.

This object is met by a device for feeding welding studs in a stud welding apparatus, the welding apparatus having a welding axis and including a welding electrode defining a stud welding location, the device comprising a magazine extending substantially parallel to the welding axis and holding a supply of the welding studs in an orientation different from the one they assume at the operating location, and transfer means for transferring the welding studs from the magazine to the operating location along a curved, preferably quarter-circular, path.

This type of movement can be readily performed by means of a pivotable lever that rotates back and forth through a limited angular range. Due to the curved shape of the path, each welding stud need be moved a short distance only to be transferred from its storage position in the magazine to its operating position at the welding electrode. The magazine may therefore extend to the immediate vicinity of the welding electrode without impeding the operation thereof.

In a preferred embodiment, the transfer means is supported for a reciprocal motion which includes an operating stroke and a back stroke, the operating stroke being powered by first spring means which is biased by the welding apparatus being pressed against a workpiece. As a result, no foreign energy is required. Since the energy for the transfer of the welding studs is stored in the spring during the usual operating cycle of the welding apparatus, no additional action is necessary. The feeding of the stud is thus achieved by the normal handling and operation of the welding apparatus.

In another preferred embodiment, the transfer means includes a stationary cam curve defined in a plane extending substantially vertically to the welding axis, a slider supported for movement along the welding axis and actuated by the first spring means, and a two-armed lever pivotally supported on the slider, one arm of the lever having a cam follower engaging the cam curve and the other arm of the lever having first catch means for withdrawing a welding stud from the magazine. Due to this concept, the basic pivotal movement of the stud transfer is superimposed by a translational movement. The magazine may therefore be positioned at a distance from the welding location equal to the length of the translational movement, so that the welding work is not impeded.

The first catch means may comprise a permanent magnet an inexpensive means for holding the head portion of a welding stud on the transfer means.

To ensure proper advancing of a stack of welding studs within the magazine, the magazine in a further embodiment of the invention includes second spring means for biasing the stack toward a front dispensing end of the magazine.

In a further preferred embodiment of the invention, each welding stud has a head portion, the welding studs are held in the magazine with their head portions staggered, and the transfer means includes second catch means which, as the transfer means reaches the end of its back stroke, moves the stack of welding studs against the force of the second spring means, thereby releasing the respective foremost welding stud from the magazine. This ensures an efficient way of separating the next stud from the stack.

The transfer means is preferably retained in its rest position defined at the end of the back stroke by a manually actuated release lever.

When used on a stud welding gun, the magazine extends along the upper side of the gun and the release lever extends to a location close to the gun handle. A compact, automatic stud welding gun is thereby provided which can be fully operated with one hand.

BRIEF DESCRIPTION OF THE DRAWINGS

A preferred embodiment of the invention will now be explained in detail with reference to the drawings, in which FIGS. 2 to 6 are side views showing part of the welding gun of FIG. 1 in consecutive operating positions during a complete welding cycle, FIGS. 1a, 5a and 6a are enlarged side views to show certain details of FIGS. 1, 5 and 6, respectively, FIG. 7 illustrates a single welding stud which may be used with the welding stud feeder of the invention, and FIG. 8 is a schematic perspective representation of a stack of welding studs.

DETAILED DESCRIPTION OF PREFERRED EMBODIMENT

Figure 1:
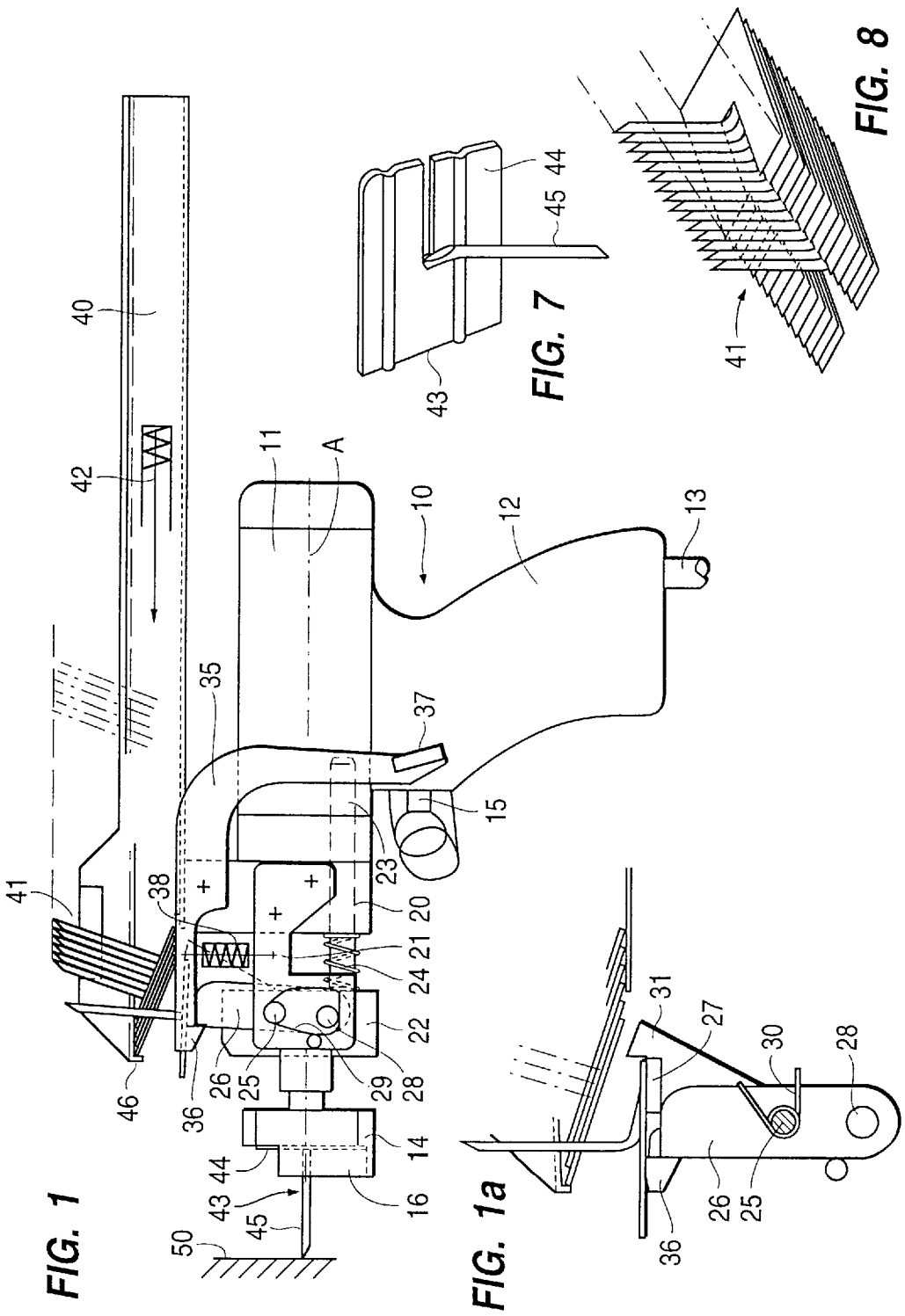
FIG. 1 is a schematic side view of a stud welding gun with an automatic welding stud feeder according to the present invention.

The stud welding gun 10 shown in FIG. 1 includes a cylindrical housing 11 provided with a handle 12. An electric power supply cable 13 enters the lower end of the handle 12. Provided inside the housing 11 are components required for supplying power to the welding electrode 14 and for moving the electrode along the axis of the housing (welding axis A).

A trigger switch 15 is disposed in front of the handle 12 for initiating the welding cycle; FIG. 1 schematically illustrates the trigger switch 15 being actuated by the index finger of a hand holding the welding gun.

The welding stud feeding mechanism according to FIG. 1 includes a support member 20 which is permanently or detachably fixed to the housing 11 of the welding gun 10. On either side of the housing 11, a forward extending support arm 21 is fixed to the support member 20. A slider 22 which is moveable along the welding axis A is provided with a pair of guide rods 23 which extend parallel to the axis A and pass through guide bores provided in the support member 20. Each guide rod 23 is surrounded by a helical compression spring 24 disposed between the back of the slider 22 and the front of the support member 20 to bias the slider 22 in the axial forward direction.

On either side of the housing 11, a two-armed transfer lever 26 is mounted on the slider 22 for rotation about a pivot 25 which is located slightly above the axis A, At the outer ends of their upper arms, the transfer levers 26 carry a permanent magnet 27 (see FIG. 1a).

According to FIG. 1, the lower arm of each transfer lever 26 has a follower pin 28 which extends transversely of the axis A and engages a cam curve 29 provided by a cut-out in the front portion of the respective support arm 21. Each transfer lever 26 is biased counter-clockwise by a coil spring 30 (FIG. 1a) mounted on the pivot 25.

A two-armed release lever 35 is mounted at an upper portion of the support member 20. The end of the forward extending arm of the release lever 35 is formed as a catch 36. In the rest position of the release lever 35, the catch 36 retains the transfer lever 26 in the position shown in FIG. 1 against the bias of the spring 30.

The second arm of the release lever 35 is curved rearward and downward, with its lower end forming a key 37 for actuation by the thumb of the hand holding the handle 12 of the welding gun 10. A tension spring 38 is disposed between the forward arm of the release lever 35 and the adjacent support arm 21 to bias the release lever 35 counter-clockwise, thereby keeping the catch 36 in engagement with the upper arm of the transfer lever 26 in the rest condition illustrated in FIG. 1.

The support member 20 carries at its upper side a welding stud magazine 40 which receives a stack 41 of welding studs schematically shown in FIG. 1. A compression magazine spring 42, also shown only schematically in FIG. 1, is provided in the magazine 40 to bias the stack 41 toward the front dispensing end of the magazine 40.

An individual welding stud 43 is shown in FIG. 7. The welding stud may be of the type disclosed in European Patent Application 0,639,424. The stud is formed integrally from a blank of sheet metal with a large disc-shaped, essentially square head portion 44 and a roll-bent shank portion 45.

FIG. 8 schematically illustrates the way in which welding studs 43 of this type are nested to form the stack 41 that may be inserted in the magazine 40 of FIG. 1.

As shown in FIGS. 1 and 1a, the welding studs in this stack, when contained within the horizontally extending magazine 40, are oriented such that their head portions are rearwardly inclined at an angle of about 20 to 30 degrees with respect to the horizontal.

In correspondence with the dimensions of the welding stud head portions 44, the magazine 40 is generally tubular with a rectangular cross-section and is provided in its upper wall with a longitudinal slot through which the shank portions 45 of the welding studs extend.

As seen in FIG. 1a, the front end of the upper magazine wall is bent downward to form a retaining ledge 46 against which the upper edge of the foremost welding stud is urged by the magazine spring 42.

Otherwise, the end face and the front portion of the lower magazine wall are open to expose the lower edge of the foremost welding stud head as well as the lower part of the head of the second welding stud. The magazine spring 42 and the nesting of the welding studs 43 prevent the foremost studs from dropping out of the front dispensing opening of the magazine 40.

DESCRIPTION OF THE OPERATION

In FIG. 1, which illustrates the operating position of the welding gun 10, a welding stud 43 is shown in its welding position in which its head portion 44 abuts the front of the welding electrode 14 and the shank portion 45 extends in the welding direction A and contacts a workpiece indicated at 50. The stud 43 is held on the welding electrode 14 by magnetic forces. To ensure proper positioning of the welding stud 43 on the electrode 14, the latter is provided with a forward extending flange 16 which surrounds the welding stud head portion 44 at its lower and lateral sides.

In this condition, the welding process is initiated by actuating the trigger switch 15 to weld the stud 43 to the workpiece 50, whereupon the welding gun is moved away from the stud.

Figure 2:
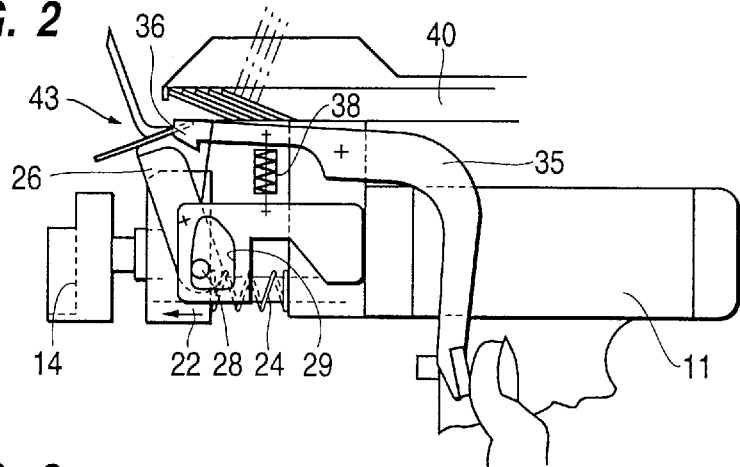

To withdraw the next welding stud from the magazine 40 and transfer it to its operating position at the welding electrode 14, the release lever 35 is depressed, as shown in FIG. 2. The release lever 35 is thereby pivoted clockwise against the force the tension spring 38 so that the catch 36 releases the upper edge of the transfer lever 26. The transfer lever 26 is now rotated counter-clockwise by virtue of the slider 22 being urged forward by the compression springs 24 and will carry with it the next welding stud 43 which was previously taken up by the magnet 27.

Due to this action, the pivot 25 of the transfer lever 26 travels forward (to the left in FIG. 1) and causes the follower pin 28 to move upward along the left-hand part of the cam curve 29 formed in the support arm 21.

Figure 3:
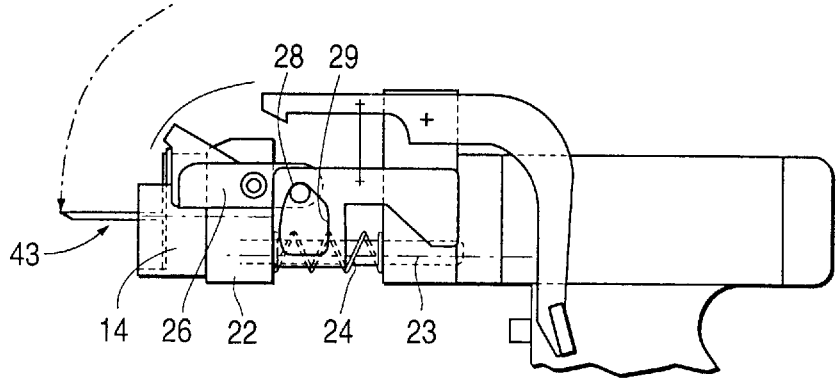

FIG. 3 shows the position in which the follower pin 28 of the transfer lever 26 has reached the uppermost location of the cam curve 29, the transfer lever 26 has reached its horizontal position, and the slider 22 abuts the back of the welding electrode 14. In this position, the wielding stud 43 has been placed by the magnet 27 in the operating location at the front of the welding electrode 14, where it is taken over by the magnet not shown) provided on the latter.

Figure 4:
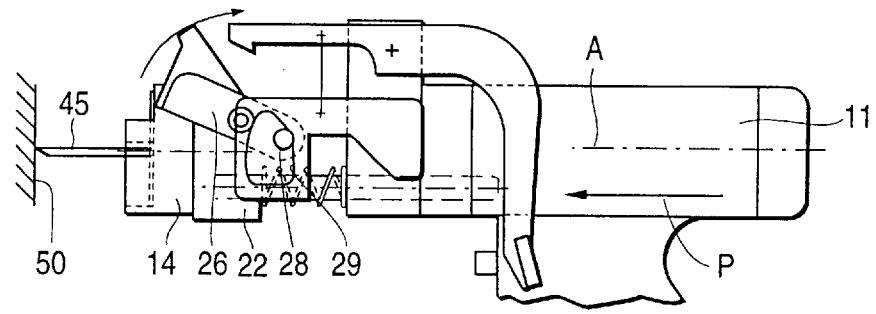

According to FIG. 4, the welding gun is now moved forward in the direction of the arrow P along the welding axis A to press the tip of the welding stud shank portion 45 against the workpiece 50. During this movement, the electrode 14 pushes the slider 22 rearward thereby compressing the springs 24. At the same time, the follower pin 28 moves down the right-hand part of the cam curve 29, thereby rotating the transfer lever 26 clockwise against the bias of its spring 30.

In the position shown in FIG. 5, the transfer lever 26 has been rotated, and the slider 22 has been moved back, to such an extend that an upward and rearward extending catch 31 (FIG. 5a) provided on the transfer lever 26 engages the head portion 44 of the foremost welding stud 43 in the magazine 40 and starts to push the stack 41 of welding studs somewhat back against the force of the magazine spring 42, The upper front edge of the head portion 44 of the foremost welding stud is thereby moved away from the upper retaining ledge 46 of the magazine 40 and becomes free.

In FIG. 6, the transfer lever 26 has returned to its initial rest position in which the upper front edge 32 (FIG. 6a) of the catch 31 has slid behind the head portion 44 of the foremost welding stud 43 in the magazine 40, which is now attracted by the magnet 27 of the transfer lever 26 and turned into the position shown in solid lines in FIG. 6a.

In this manner, the next welding stud has reached the transfer starting position, and the apparatus is again in the initial condition shown in FIG. 1. By actuating the trigger switch 15, the next welding cycle may now be started.

As appears from the preceding description, initiation of the automatic welding stud feeding process requires but a short depression of the release lever 35 in order momentarily to lift the catch 36, thereby releasing the transfer lever 26.

In an alternative embodiment, the catch 36 may be lifted by an electromagnet actuated upon each welding step by a sequencer. A further electromagnet may be provided to push the slider 22 back to compress the springs 24, which electromagnet may again be actuated upon each welding step by a sequencer. Instead of electromagnets, pneumatically or hydraulically operated drives may be employed.

I claim:

1. A device for feeding a stack of welding studs to a stud welding gun, said welding gun defining a welding axis and including a handle and a welding electrode defining a stud welding location, the device comprising:

a magazine adapted for stationary mounting on said gun and extending substantially parallel to said welding axis, said magazine holding said welding studs in an orientation different from the one said welding studs assume at said welding location, and a linkage transferring a next one of said welding studs from said magazine to said welding location along a curved path.

2. The device of claim 1, wherein said path extends through substantially a quarter of a circle.

3. A device for feeding a stack of welding studs to a stud welding gun, said welding gun defining a welding axis and including a handle and a welding electrode defining a stud welding location, the device comprising:

a magazine adapted for stationary mounting on said gun and extending substantially parallel to said welding axis, said magazine holding said welding studs in an orientation different from the one said welding studs assume at said welding location, and a linkage transferring a next one of said welding studs from said magazine to said welding location along a curved path, said linkage includes a slider supported for reciprocal movement in an operating stroke and a back stroke, and a first spring biasing said slider in said operating stroke, wherein said first spring is adapted to be resiliently loaded by pressing said welding gun against a workpiece.

4. The device of claim 3, wherein said slider is supported for movement along said welding axis, and wherein said linkage further includes a stationary cam curve defined in a plane extending substantially tangentially with respect to said welding axis, and a two-armed lever pivotally supported on said slider, a first arm of said lever having a cam follower engaging said cam curve and a second arm of said lever having a catch withdrawing said next one of said welding studs from said magazine.

5. The device of claim 4, wherein said catch includes a magnet holding said next one of said welding studs on said lever.

6. The device of claim 3, wherein said magazine includes a second spring biasing the stack of welding studs toward a front dispensing end of the magazine.

7. The device of claim 6, wherein said linkage includes a catch moving said stack of welding studs against the force of said second spring as said slider reaches an end of said back stroke, thereby releasing said next one of said welding studs from said front dispensing end of said magazine.

8. The device of claim 3, further comprising:

a manually actuated release lever for retaining said slider in a rest position defined at an end of said back stroke.

9. The device of claim 8, wherein said magazine is adapted to be mounted opposite said welding gun handle, and said release lever extending to a location close to said handle so that said welding gun can be operated by one hand.

* * * * *